United States Patent [19]

Carr

[11] Patent Number: 5,072,756

[45] Date of Patent: Dec. 17, 1991

[54] VALVE ASSEMBLY FOR FLUID LINE CONNECTION

[75] Inventor: Richard F. Carr, Lomita, Calif.

[73] Assignee: Scholle Corporation, Irvine, Calif.

[21] Appl. No.: 646,536

[22] Filed: Jan. 25, 1991

[51] Int. Cl.⁵ ............................................. F17D 1/08
[52] U.S. Cl. .............................................. 137/614.04
[58] Field of Search ............. 137/614.04, 630.22; 251/149.5, 149.6, 149.3, 149.1; 222/501, 522

[56] References Cited

U.S. PATENT DOCUMENTS

| | | | |
|---|---|---|---|
| 2,925,103 | 2/1960 | Kerr et al. | 251/149.5 X |
| 3,777,771 | 12/1973 | De Visscher | 137/614.04 X |
| 4,137,930 | 2/1979 | Scholle | 137/68 R |
| 4,286,636 | 9/1981 | Credle | 141/114 |
| 4,353,488 | 10/1982 | Schneiter et al. | 222/501 |
| 4,380,310 | 4/1983 | Schneiter et al. | 222/501 |
| 4,421,146 | 12/1983 | Bond et al. | 141/349 |
| 4,564,132 | 1/1986 | Lloyd-Davies | 222/522 |
| 4,948,014 | 8/1990 | Rutter et al. | 251/149.6 X |

Primary Examiner—Martin P. Schwadron
Assistant Examiner—Kevin L. Lee
Attorney, Agent, or Firm—Richard F. Carr; Richard L. Gausewitz; Allan Rothenberg

[57] ABSTRACT

A valve assembly is provided which is in two units, each of which assumes a normally closed position when the units are separated and is opened when the units are mated. One unit includes a valve body with a transverse wall having an opening therethrough which is normally closed by a diaphragm which is provided with openings through it outside of the location where it engages the wall. The other valve unit includes a valve body having a spring-biased plunger which at its end has an integral pin engageable with the diaphragm when the units are advanced toward each other for deflecting the diaphragm away from the opening in the transverse wall, and an additional projecting portion for engaging the transverse wall to cause the plunger to be deflected away from the valve seat, thereby to open up communication through both valves.

8 Claims, 4 Drawing Sheets

VALVE ASSEMBLY FOR FLUID LINE CONNECTION

BACKGROUND OF THE INVENTION

Syrup for soft drinks used in restaurants, bars and the like frequently is marketed in bag-in-box containers from which it is conducted to the point of use through flexible tubing. Wine and other liquids may be dispensed in a similar manner. It is desirable to have a normally closed valve at the container to assure that there is no flow of fluid until the container is connected to the line. Similarly, the line needs to be provided with a shut-off valve to avoid leakage when it is not connected to the container. A unit of this type is disclosed in U.S. Pat. No. 4,564,132. Here the valve attached to the container includes a body with a transverse wall provided with openings, and a bead around the openings. A diaphragm beneath the wall engages the bead preventing flow through these openings. There are openings through the diaphragm outside of where it engages the bead, but in the normal position where the diaphragm engages the bead there is no communication from the diaphragm openings to the opening in the wall.

The other valve unit includes a movable valve member biased toward an end valve seat by a spring. The two valve units are coupled together by means of a rotatable threaded collar which causes the flat end of the valve member to engage a stem that projects from the center of the diaphragm and extends through a central opening in the wall. This is to deflect the diaphragm away from the sealing bead. Also, the flat end of the valve member engages a collar around the pin to cause displacement of the valve member to the opened position.

The disadvantage of this design is that the stem that projects from the diaphragm is not sufficiently rigid when it is made integral with the diaphragm as disclosed for the preferred embodiment in the patent. The diaphragm material must be flexible and when the valve is made in a desirable size the stem has little column strength. Instead of pressing the diaphragm away from the sealing bead, the stem may become bent and fail to move the diaphragm sufficiently. The alternative is to provide a separate stem placed over the end of the diaphragm to extend up through the collar for engagement by the valve member. This also is undesirable because it requires the existence of an additional element in the assembly, raising the cost of construction and the cost of assembly, as well as introducing the possibility of malfunction through improper installation.

SUMMARY OF THE INVENTION

The present invention provides an improved valve unit overcoming the disadvantages of the prior art including those set forth above for the design of U.S. Pat. No. 4,564,132. In the present invention the number of parts is minimized, the cost of construction is reduced and there is full assurance of complete reliability of operation.

In this invention, the valve unit that is connected to the container has a transverse wall that has a flat upper surface, rather than including a collar, as in prior design. The diaphragm beneath the transverse wall has no integral stem projecting from it. Neither is there a separate stem provided.

The other valve unit, which serves as the line connector, includes a valve plunger having two projecting portions at one end. One of these is an elongated pin element that extends from the end of the plunger and can pass through an opening in the transverse wall of the container valve unit to engage the diaphragm as the two valves are advanced toward each other. This projecting pin deflects the diaphragm away from the transverse wall to open communication through openings in the diaphragm and in the wall. The valve plunger also includes a second projecting portion which extends around the pin and is of shorter dimension so that it does not project as far. As the valves are moved toward each other, the second projecting portion engages the outer surface of the transverse wall of the container valve unit, arresting the movement of the valve plunger. The body of the connector valve then continues to move, causing the valve plunger to be lifted from its seat. As a result, communication is created through the openings in the diaphragm, the openings in the transverse wall, the inlet to the valve body of the connector valve and its outlet end where it is connected to suitable tubing for discharge to the point of use.

The valve assembly has very few parts, is reliable in its operation and is economically manufactured. Maximum flow area is provided through the valve.

In an alternative embodiment, a projecting element on the wall of the container valve engages the valve plunger to cause the opening of the line connector valve.

BRIEF DESCRIPTION OF THE DRAWINGS

FIG. 7 is a longitudinal sectional view of an alternate embodiment, with the valves in the closed position; and FIG. 8 is a view similar to FIG. 7, but with the two valves fully mated and in the open position.

DETAILED DESCRIPTION OF THE INVENTION

Figure 1:
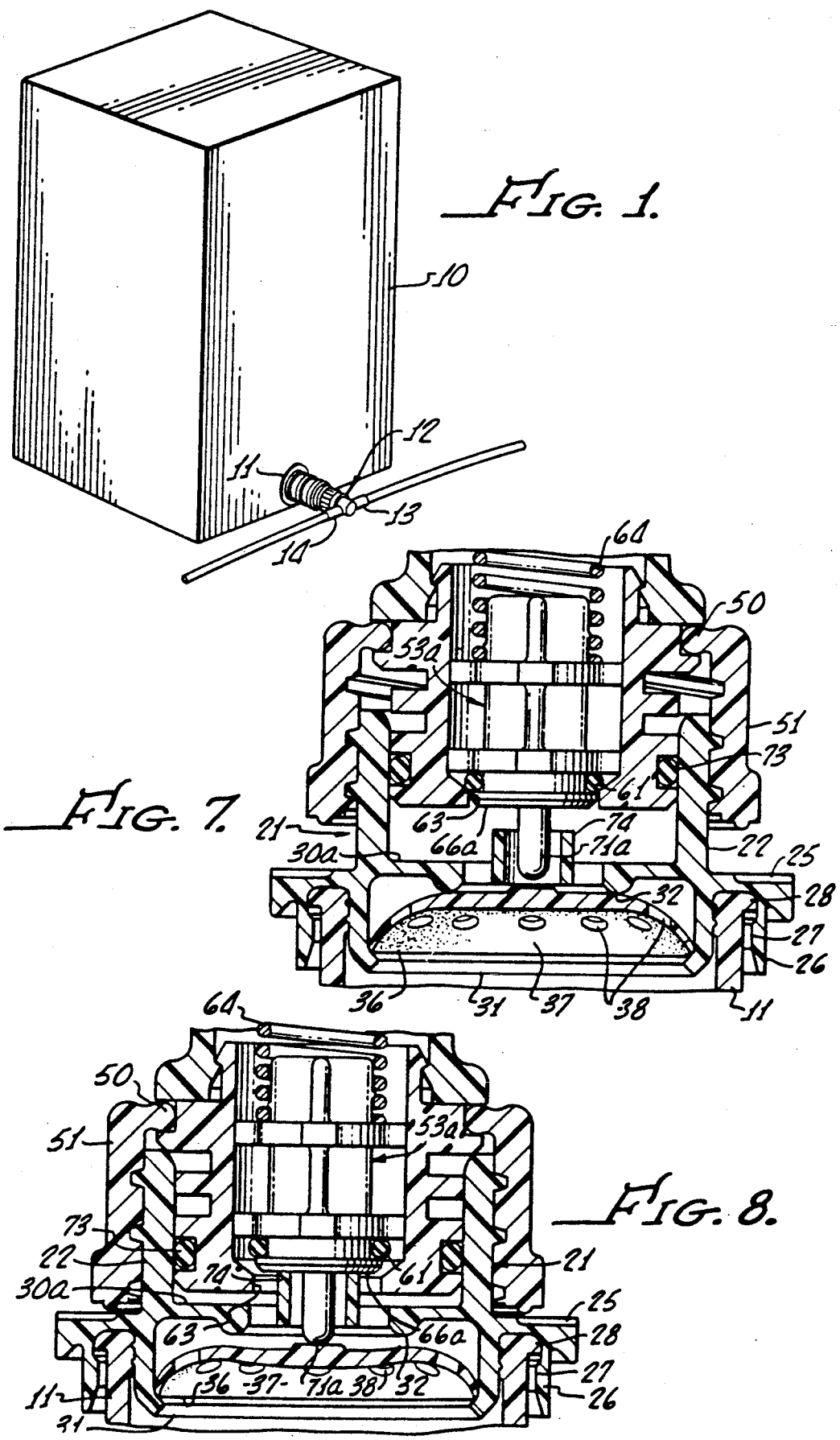
FIG. 1 is a perspective view of a container incorporating the valve unit of this invention.
Figure 2:
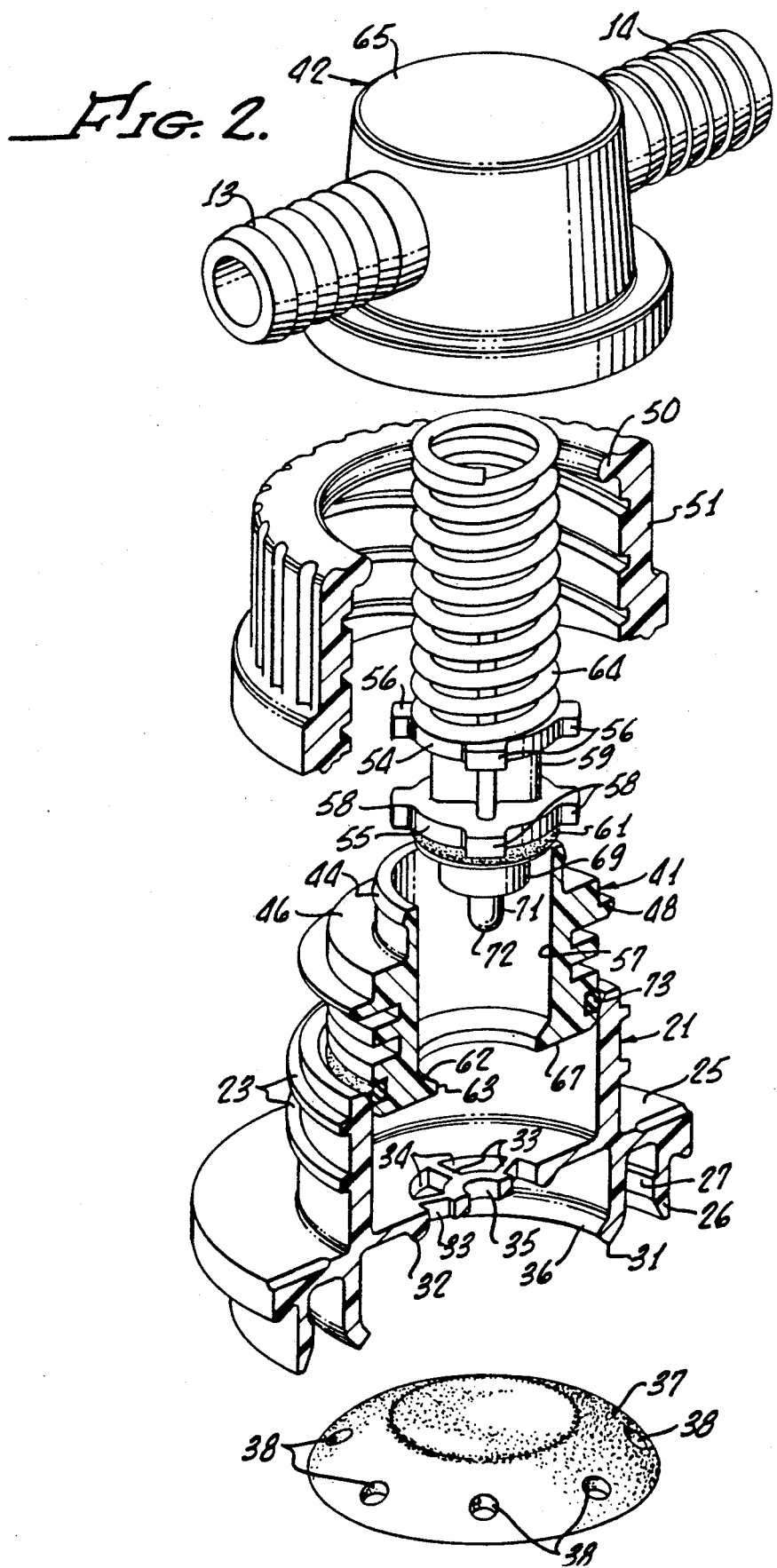
FIG. 2 is an enlarged, exploded perspective view of the valve assembly, partially in section.

As shown in FIG. 1, the box 10 of a bag-in-box syrup container is provided with an opening in its side through which extends the nozzle 1; connected to a bag within the box. The nozzle 11 discharges into a line connector 12 which, through opposed outlets 13 and 14, can discharge the contents of the bag within the box 10 to the point of use.

Figure 3:
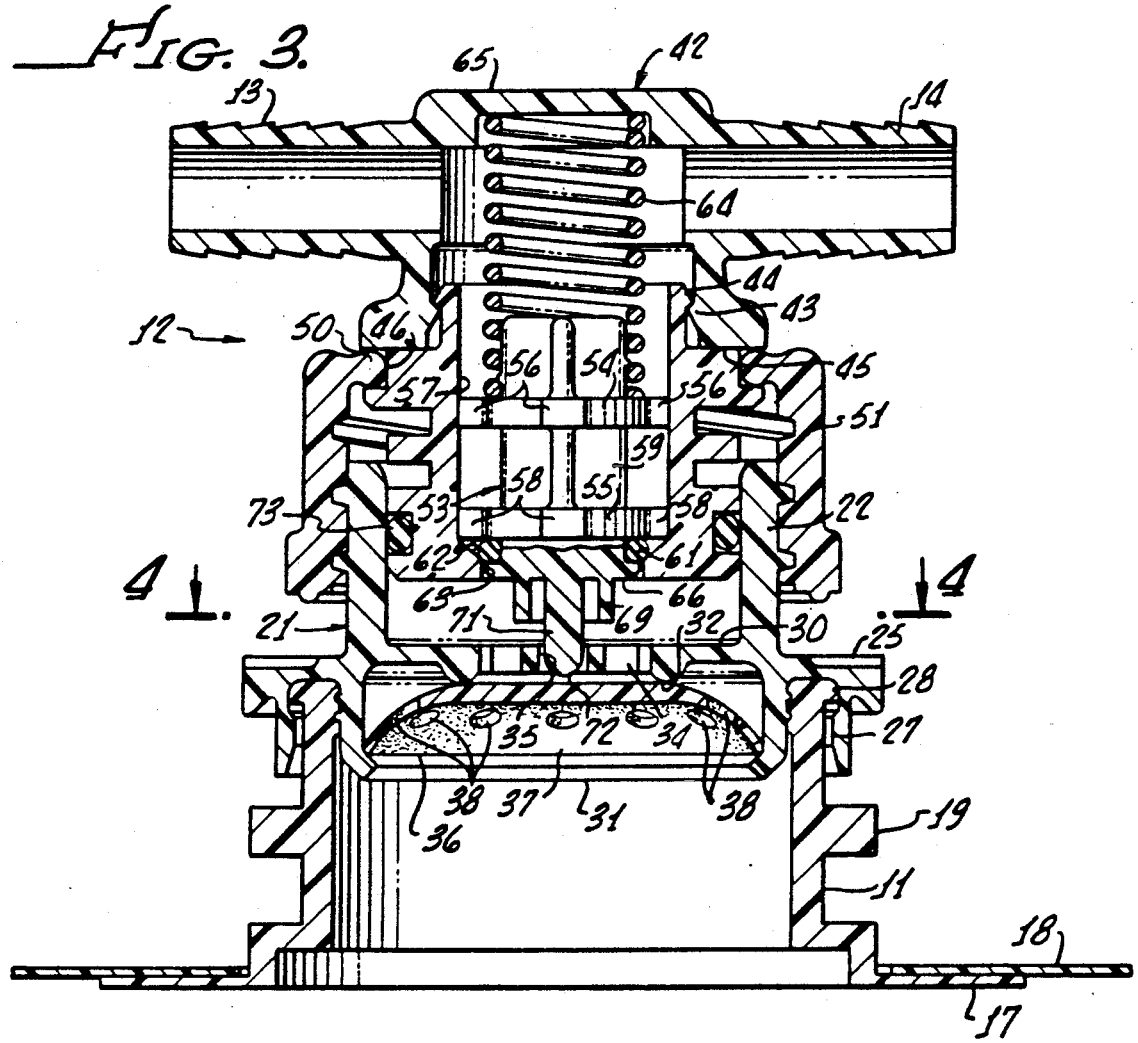
FIG. 3 is a longitudinal sectional view of the valve assembly, shown at an intermediate position during the mating of the two valves, prior to the opening of the valves.
Figure 4:
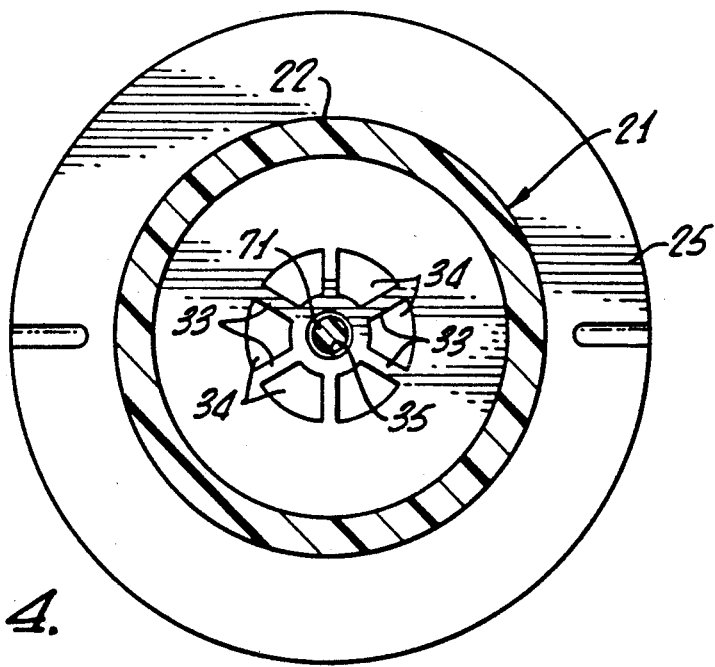
FIG. 4 is a transverse sectional view taken along line 4—4 of FIG. 3.

The nozzle 11, as seen in FIG. 3, includes a wide flange 17 at its inner end which is secured to the wall of a bag 18 that is disposed within the box 10. Outwardly of the flange !7, the nozzle 11 is of tubular configuration and includes a flange 19 on its exterior for engagement with filling equipment. This construction of the nozzle is conventional.

A container valve 21, which is connected to the nozzle 11, includes a tubular body 22 on the outer end portion of which are exterior threads 23. The inner end portion of the container valve body 22 is received within the nozzle 11. A transverse flange 25 of the valve body 22 extends over the outer end of the nozzle 11. An annular section 26 projects from the transverse flange 25, defining an annular space that receives the outer end portion of the nozzle 11. A lip 27 on the inner surface of the portion 26 of the valve body 22 cooperates with a flange 28 on the nozzle 11 to retain the valve body 22 on the nozzle.

A transverse wall 30 extends across the interior of the valve body 22 at a location spaced inwardly from the inner end 31 of the valve body. The wall 30 is flat on its outer surface, but is provided with a rounded annular bead 32 on its inner surface. Inside of the bead 32 are radially directed webs 33 that define openings 34 between them. There is, in addition, a central opening 35 through the wall 30.

At its inner end 31, the valve body 22 includes an inwardly inclined lip 36 which retains the edge of a flexible diaphragm 37 that fits within the inner end portion of the valve body. The diaphragm 37 is dome-shaped and in its free position engages the bead 32 on the inner surface of the wall 30 of the valve body 22. A series of openings 38 extends through the wall of the diaphragm 37 outside of the location of engagement with the bead 32. Hence, in the free position of the diaphragm 37, shown in FIG. 3, the diaphragm engages the bead 32, forming a seal that precludes flow outwardly past the diaphragm through the valve body 22. Any pressure from within the container 18 will simply force the diaphragm 37 tighter against the bead 32 to enhance the seal so that no flow can take place.

The connector valve assembly 12 includes a tubular body 41 which at its outer end connects to a hollow T-shaped member 42 that includes the two outlets 13 and 14. The member 42 snaps into place over the outer end portion of the valve body 41 as a bead 43 on the member 42 moves past an opposing bead 44 on the valve body 41. In addition, to assure a secure attachment, the end surface 45 of the member 42 may be sonically welded to a radial shoulder 46 near the outer end of the valve body 41. The radially outer portion of the surface 45 of the member 42 extends beyond the surface 46 of the valve body 41 and cooperates with a radially outwardly projecting flange 48 on the member 41 to define an annular groove. An annular inwardly directed flange 50 of a collar 51 is received and retained within the annular groove. The collar 51 thereby is rotatable relative to the valve body 41, but does not move axially relative to it. The inner wall of the collar 51 is spaced from the outer wall of the valve body 41 and is provided with threads that can mate with the threads 23 on the valve body 21.

Inside the valve body 41 is a plunger 53 which includes two spaced circular disc portions 54 and 55. Four lugs 56 project outwardly beyond the disc portion 54 to engage the inner cylindrical surface 57 of the valve body 41. Similarly, four lugs 58 extend from the disc portion 55 to the wall 57. This guides the plunger 53 within the valve body 41, and provides a passageway through the valve body around the disc portions 54 and 55 and intermediate the lugs 56 and 58. A cruciform portion 59 extends between the two disc portions 54 and 55 and outwardly beyond the disc portion 54.

Beneath the disc portion 55 is an annular groove which receives an O-ring 61 that is engageable with a tapered valve seat 62 in the valve body 41 adjacent the inner end of the surface 57. The end portion of the plunger 53 extends through the opening 63 at the inner end of the lo valve body 41 adjacent the valve seat 62. A compression spring 64 bears against the outer disc portion 54 of the plunger 53 and the outer wall 65 of the T-shaped member 42, biasing the plunger to a normal closed position in which the O-ring 61 bears against the valve seat 62. This precludes the flow of liquid through the connector valve assembly. In this position, a flat transverse surface 66 of the plunger is substantially aligned with the inner end surface 67 of the valve body 41.

Projecting longitudinally beyond the surface 66 of the plunger 53 is an annular flange 69 which is provided with several slots 70 through its wall. Projecting longitudinally from the end surface 66 of the plunger 53 at its center is a cylindrical pin 71 which is spaced from the flange 69. The pin 71 is longer than the flange 69 and is provided with a rounded outer end 72. The flange 69 and pin 71 are integral with the remainder of the plunger 53.

Figure 6:
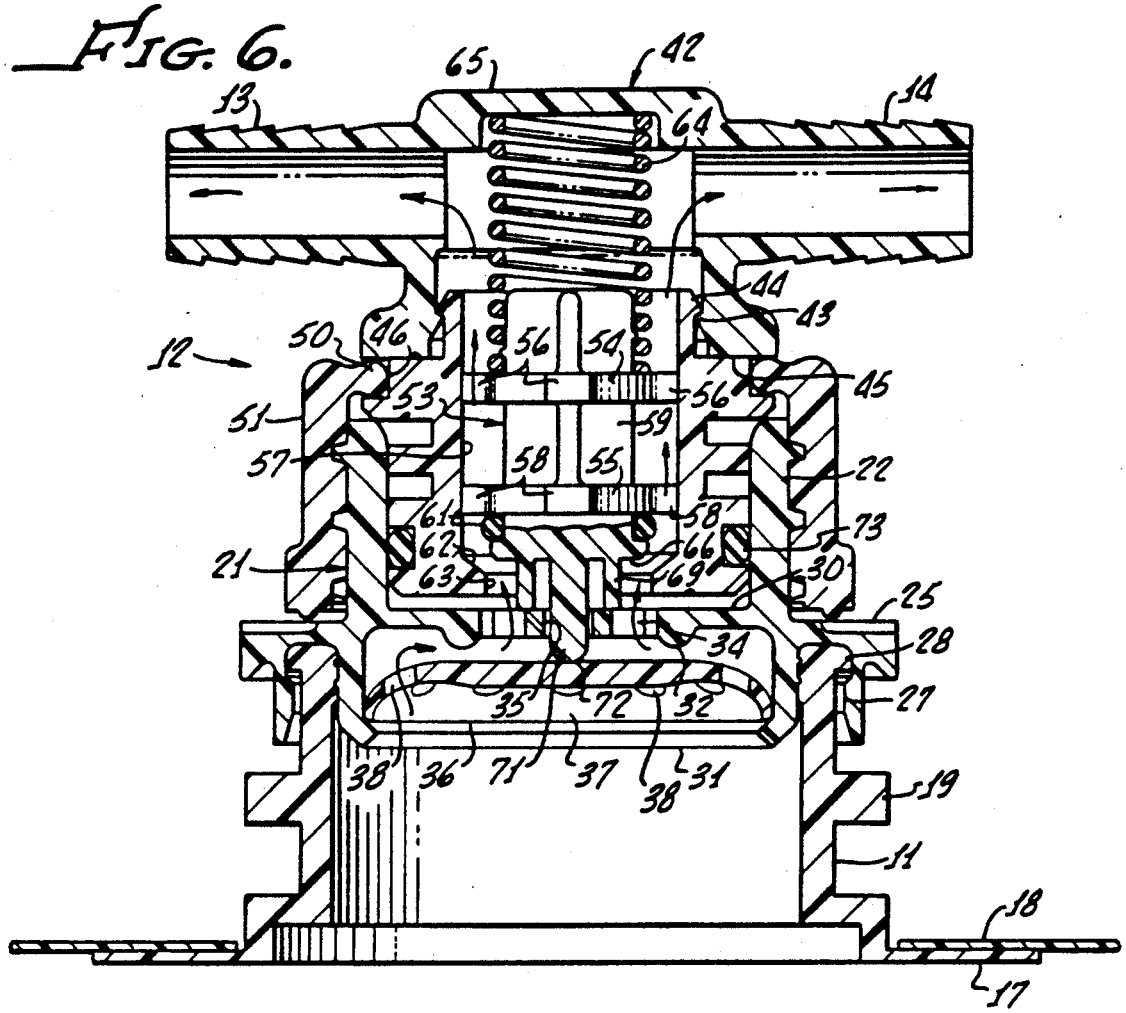
FIG. 6 is a view similar to FIG. 3 with the valves fully mated and in the open position.
Figure 5:
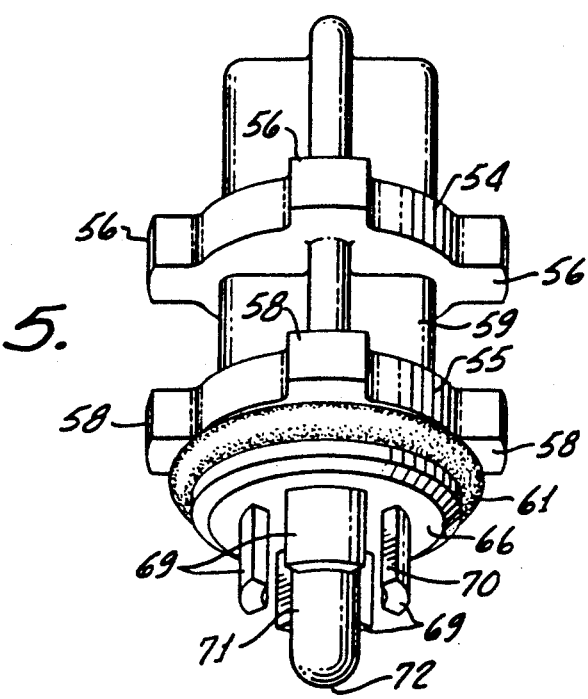
FIG. 5 is a perspective view of the plunger of the line connector valve.

The connector valve 12 may be connected to the container valve 21 by threading the collar 51 onto the valve body 22. As this is done, one end of the valve body 41 enters the valve body 21 where it is sealed by means of an O-ring 73 around the periphery of the valve body 41. Continued rotation of the collar 51 will advance the valve body 41 axially onto the valve body 21. As this occurs, the pin 71 will pass through the opening 35 in the wall 30 of the valve body 21, engaging the top of the diaphragm 37. As the pin 71 moves axially, it will deflect the diaphragm 37 away from the bead 32. This opens up communication through the openings 38 in the diaphragm and the openings 34 in the wall 30, as seen in FIG. 6.

The plunger 53 moves axially with the valve body 41 in response to the rotation of the collar 51 until the end of the annular flange 69 engages the wall 30 intermediate the openings 34 and 35. The movement of the plunger is thus arrested. Continued rotation of the collar 51 causes further movement of the valve body 41 while the plunger 53 remains stationary. As a result, the O-ring 61 is lifted off of the seat 62 as the spring 64 becomes compressed. The connector valve 11 then is opened so that fluid can flow to the two outlets 13 and 14. The flow path is open through the diaphragm openings 38, the openings 34 and 35 in the wall 30, and through the notches 70. The flow path continues through the inlet of the connector valve at the valve seat 62 and through the interior of the valve body 41 to the outlet member 42 and the two outlets 13 and 14.

Both valves are closed automatically by reverse rotation of the collar 51. As the valve body 41 is moved away from the container valve 21, the spring 64 biases the plunger 53 to the closed position and the diaphragm is released and assumes its free position where it engages the bead 32.

The embodiment of FIGS. 7 and 8 is identical to the previously described embodiment, except for the arrangement to open the plunger of the connector valve. There, the plunger 53a includes a pin 71a projecting from the end surface 66a of the plunger in the same manner as the plunger and pin of the other embodiment. However, the plunger 53a does not include a projecting flange corresponding to the flange 69. Instead, the surface 66a is flat.

The plunger 53a is moved to its open position by means of an annular flange 74 on the outer side of the transverse wall 30a around the central opening 35a through which the pin 71a extends to displace the diaphragm 37. The engagement of the flange 74 by the plunger 53a stops the movement of the plunger to open the connector valve, while the pin 71a deflects the diaphragm 37 to open the container valve.

The foregoing detailed description is to be clearly understood as given by way of illustration and example only, the spirit and scope of this invention being limited solely by the appended claims.

What is claimed is:

1. A normally closed valve assembly for discharging liquid from a container comprising a first valve unit including
    a first tubular body having a transverse wall and an opening through said wall,
    and a diaphragm having a portion engaging one side of said wall around said opening so as to prevent fluid flow through said opening,
        said diaphragm having opening means therethrough outside said portion thereof,
    a second valve unit including
        a second tubular body having an inlet opening and an outlet opening, and a valve seat adjacent said inlet opening,
        a movable member in said second tubular body, and
        resilient means biasing said movable member toward said seat so that a portion of said movable member adjacent one end thereof engages said seat for closing said inlet opening of said second tubular body, and
    means for interconnecting said first and second valve units so that said first and second tubular bodies are advanced relatively toward each other,
        said movable member being relatively advanced toward said transverse wall when said first and second tubular bodies are so relatively advanced,
        said movable member having a first projecting means projecting from said one end and engageable with said diaphragm when said first and second tubular bodies are so relatively advanced toward each other for displacing said diaphragm away from said opening in said wall and allowing communication through said opening means in said diaphragm to said opening in said transverse wall,
        said movable member having a second projecting means projecting from said one end and engageable with said transverse wall for arresting the movement of said movable member toward said transverse wall,
        whereby continued relative advancement of said first and second tubular bodies causes said movable member to move away from said valve seat thereby to permit fluid communication from said opening in said transverse wall through said inlet opening and said second tubular body to said outlet opening.

2. A device as recited in claim 1 in which said first projecting means comprises a pin projecting from said one end of said movable member, said transverse wall having opening means therethrough through which said pin can extend for so engaging said diaphragm, and said second projecting means comprises a projecting element extending from said one end of said movable member, said second projecting means projecting from said one end of said movable member for a lesser distance than does said first projecting means.

3. A device as recited in claim 2 in which said pin is in the central portion of said one end of said movable member, and said projecting element is positioned around said pin.

4. A device as recited in claim 2 in which said pin is in the central portion of said one end of said movable member, and said projecting element is an annular flange circumscribing said pin and spaced therefrom.

5. A device as recited in claim 4 in which said annular flange is provided with openings therethrough for permitting the flow of fluid.

6. A normally closed valve assembly for discharging liquid from a container comprising
    a first valve unit including
        a first tubular body having a transverse wall and an opening through said wall,
        and a diaphragm having a portion engaging one side of said wall around said opening so as to prevent fluid flow through said opening,
            said diaphragm having opening means therethrough outside said portion thereof,
    a second valve unit including
        a second tubular body having an inlet opening and an outlet opening, and a valve seat adjacent said inlet opening,
        a movable member in said second tubular body, and resilient means biasing said movable member toward said seat so that a portion of said movable member adjacent one end thereof engages said seat for closing said inlet opening of said second tubular body, and
    means for interconnecting said first and second valve units so that said first and second tubular bodies are advanced relatively toward each other,
        said movable member being relatively advanced toward said transverse wall when said first and second tubular bodies are so relatively advanced,
        said movable member including projecting means projecting from said one end thereof beyond said portion of said movable member and engageable with said diaphragm for displacing said diaphragm away from said opening in said wall and allowing fluid flow through said opening means in said diaphragm and through said opening in said wall, said movable member including a surface inwardly of the outer end of said projecting means, said transverse wall being substantially flat and including a portion engageable by said surface of said movable member, whereby
        said movable member and said wall include interengageable surfaces for arresting the movement of said movable member when said first and second tubular bodies are so relatively advanced toward each other so that continued advancement of said tubular bodies causes said movable member to move away from said valve seat to allow fluid flow through said second tubular body to said outlet.

7. A normally closed valve assembly for discharging liquid from a container comprising
    a first valve unit including
        a first tubular body having a transverse wall and an opening through said wall, and a diaphragm having a portion engaging one side of said wall around said opening so as to prevent fluid flow through said opening,
said diaphragm having opening means therethrough outside said portion thereof,
a second valve unit including
a second tubular body having an inlet opening and an outlet opening, and a valve seat adjacent said inlet opening,
a movable member in said second tubular body, and resilient means biasing said movable member toward said seat so that a portion of said movable member adjacent one end thereof engages said seat for closing said inlet opening of said second tubular body, and
means for interconnecting said first and second valve units so that said first and second tubular bodies are advanced relatively toward each other,
said movable member being relatively advanced toward said transverse wall when said first and second tubular bodies are so relatively advanced,
said movable member including an elongated pin integral with said movable member projecting from said one end thereof beyond said portion of said movable member and engageable with said diaphragm for displacing said diaphragm away from said opening in said wall and allowing fluid flow through said opening means in said diaphragm and through said opening in said wall,
said movable member including a surface axially inwardly of the outer end of said pin,
said transverse wall being substantially flat and including a portion engageable by said surface of said movable member, whereby said movable member and said wall include interengageable surfaces for arresting the movement of said movable member when said first and second tubular bodies are so relatively advanced toward each other so that continued advancement of said tubular bodies causes said movable member to move away from said valve seat to allow fluid flow through said second tubular body to said outlet.

8. A normally closed valve assembly for discharging liquid from a container comprising
a first valve unit including
a first tubular body having a transverse wall and an opening through said wall,
and a diaphragm having a portion engaging one side of said wall around said opening so as to prevent fluid flow through said opening,
said diaphragm having opening means therethrough outside said portion thereof,
a second valve unit including
a second tubular body having an inlet opening and an outlet opening, and a valve seat adjacent said inlet opening,
a movable member in said second tubular body, and
resilient means biasing said movable member toward said seat so that a portion of said movable member adjacent one end thereof engages said seat for closing said inlet opening of said second tubular body, and
means for interconnecting said first and second valve units so that said first and second tubular bodies are advanced relatively toward each other,
said movable member being relatively advanced toward said transverse wall when said first and second tubular bodies are so relatively advanced,
said movable member including projecting means projecting from said one end thereof beyond said portion of said movable member and engageable with said diaphragm for displacing said diaphragm away from said opening in said wall and allowing fluid flow through said opening means in said diaphragm and through said opening in said wall, said movable member including a surface inwardly of the outer end of said projecting means, said transverse wall including a portion engageable by said surface of said movable member, whereby
said movable member and said wall include interengageable surfaces for arresting the movement of said movable member when said first and second tubular bodies are so relatively advanced toward each other so that continued advancement of said tubular bodies causes said movable member to move away from said valve seat to allow fluid flow through said second tubular body to said outlet.

* * * * *